(12) United States Patent
Woll et al.

(10) Patent No.: US 12,288,999 B2
(45) Date of Patent: Apr. 29, 2025

(54) METHOD FOR OPERATING AN ELECTROCHEMICAL ENERGY STORAGE SYSTEM WITH A PLURALITY OF ENERGY STORAGE STRINGS

(71) Applicant: Robert Bosch GmbH, Stuttgart (DE)

(72) Inventors: Christoph Woll, Gerlingen (DE); Gunther Handte, Unterensingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 18/459,210

(22) Filed: Aug. 31, 2023

(65) Prior Publication Data

US 2024/0106248 A1    Mar. 28, 2024

(30) Foreign Application Priority Data

Sep. 23, 2022   (DE) .................... 10 2022 210 069.7

(51) Int. Cl.
| | |
|---|---|
| *H02J 7/00* | (2006.01) |
| *H01M 10/42* | (2006.01) |
| *H01M 10/48* | (2006.01) |
| *H01M 50/512* | (2021.01) |

(52) U.S. Cl.
CPC ......... *H02J 7/0013* (2013.01); *H01M 10/425* (2013.01); *H01M 10/482* (2013.01); *H01M 50/512* (2021.01); *H02J 7/0047* (2013.01); *H01M 2010/4271* (2013.01); *H01M 2220/10* (2013.01); *H01M 2220/20* (2013.01); *H01M 2220/30* (2013.01); *H02J 2207/20* (2020.01)

(58) Field of Classification Search
CPC .... H02J 7/0013; H02J 7/0047; H02J 2207/20; H01M 50/512; H01M 10/425; H01M 10/482; H01M 2010/4271; H01M 2220/10; H01M 2220/20; H01M 2220/30
See application file for complete search history.

(56) References Cited

U.S. PATENT DOCUMENTS

| | | | |
|---|---|---|---|
| 2019/0013681 A1 | 1/2019 | De Breucker et al. | |
| 2023/0396079 A1* | 12/2023 | Ono ..................... | H01M 10/441 |

FOREIGN PATENT DOCUMENTS

| | | | |
|---|---|---|---|
| DE | 102020214760 A1 | 5/2022 | |
| EP | 0609101 B1 | 6/2002 | |

* cited by examiner

*Primary Examiner* — Carlos Amaya
(74) *Attorney, Agent, or Firm* — NORTON ROSE FULBRIGHT US LLP

(57) ABSTRACT

A method for operating an electrochemical energy storage system with a plurality of energy storage strings which comprise a plurality of electrochemical energy stores. The energy storage strings can be electrically connected in parallel by means of first switches.

6 Claims, 3 Drawing Sheets

METHOD FOR OPERATING AN ELECTROCHEMICAL ENERGY STORAGE SYSTEM WITH A PLURALITY OF ENERGY STORAGE STRINGS

CROSS REFERENCE

The present application claims the benefit under 35 U.S.C. § 119 of German Patent Application No. DE 10 2022 210 069.7 filed on Sep. 23, 2022, which is expressly incorporated herein by reference in its entirety.

FIELD

The present invention relates to a method for operating an electrochemical energy storage system with a plurality of energy storage strings, an electrochemical energy storage system, a computer program, and a use of a method for operating an electrochemical energy storage system.

BACKGROUND INFORMATION

In purely electrically or hybrid driven vehicles, a battery is used as a power source. This high-voltage battery typically has a voltage level of at least 400V and consists of a plurality of battery cells which are combined into modules, of which several form a subbattery.

To meet the desired battery capacity, several such subbatteries are electrically connected in parallel. Each individual subbattery is referred to as a string, several of these parallel-connected battery strings form the overall battery. This battery supplies the drive with the high voltage and recharges the low-voltage battery via a DC voltage converter. The voltage of the low-voltage battery ranges from 12V for cars to 24V for trucks and mobile electrically driven work machines, such as excavators, wheel loaders or tractors, and up to 48V, which will come on the market in the future.

If one battery string fails, the high-voltage battery still provides enough charging power for the low-voltage battery; only the total capacity of the high-voltage battery decreases and with it the still available useful life. The defective high-voltage battery string with its still intact battery cells is completely lost. The use of the defective battery string is currently not foreseen.

U.S. Patent Application No. US 2019/013681 A1 describes a way to reconfigure a rechargeable energy storage system with new capacitors or batteries or fuel cell packs which are electrically arranged in series or in parallel.

European Patent No. EP 0 609 101 B1 describes an apparatus for electrical power supply which is provided with a plurality of secondary batteries connected in series and/or in parallel, means for detecting faults in each of the secondary batteries and means for electrically disconnecting the output terminals of a faulty secondary battery, and, in the case of a series connection, short-circuiting the terminals, the secondary battery of which shows an abnormality.

High-voltage batteries for electrically driven vehicles comprise a plurality of parallel-connected battery strings. The greater the required capacity, the more strings are connected in parallel, such as in mobile electrically driven work machines, for example. If a cell fails in a string of the battery or if there is an interruption between two cells, the battery string is switched off completely and is no longer available to the power supply of the electrically drivable vehicle. The still remaining intact cells, or the cells that are still connected to one another, are lost and no longer contribute to the overall energy balance of the battery.

It is an object of the present invention to further improve the related art. This object is achieved by features of the present invention.

SUMMARY

The procedure according to an example embodiment of the present invention may have the advantage that the method for operating an electrochemical energy storage system with a plurality of energy storage strings which comprise a plurality of electrochemical energy stores, wherein the energy storage strings can be electrically connected in parallel by means of first switches, comprises the following steps:
   a) ascertaining actual state variables of the electrochemical energy stores which represent a current state of the electrochemical energy stores;
   b) comparing the actual state variables with target state variables which represent a target state of the electrochemical energy stores;
   c) switching at least one of the first switches to electrically disconnect at least one energy storage string as a function of the comparison;
   d) Switching at least one second switch to electrically bypass electrochemical energy stores in the disconnected energy storage string;
   e) switching a third switch disposed between the electrochemical energy stores and a DC voltage converter, thereby electrically connecting the disconnected energy storage string to an input of the DC voltage converter;

This advantageously allows an energy storage string of the electrochemical energy storage system, which is disconnected in the event of a fault, to be used to supply low-voltage consumers, so that the supply of the electrical consumers is not at the expense of the total capacity that exists for the drive and, in the case of work machines additionally for the working process, as a result of which more energy is available for the high-voltage consumers than in conventional electrochemical energy storage systems.

The method advantageously works independent of the type of fault, such as cell faults or faults in the assembly and connection technique, for instance. The method according to the present invention thus enables longer use times in the event of a fault than conventional solutions. In particular for work machines, for example in road construction or in agriculture, this improved reliability is highly advantageous.

There is furthermore advantageously no need to take into account state-of-charge equalization procedures between the energy storage strings.

Further advantageous embodiments of the present invention are disclosed herein.

According to an example embodiment of the present invention, the method further comprises the following step:
   f) driving the DC voltage converter with a predetermined target voltage variable.

The method is advantageously suitable on both the high-voltage side and the low-voltage side of the electrochemical energy storage system for practically all voltage levels.

The method according to an example embodiment of the present invention further comprises the following step:
   g) providing a voltage variable at an output of the DC voltage converter which represents an electric voltage adapted to electrical consumers.

Advantageously, an already existing DC voltage converter can continue to be used, for instance if the input voltage range differs by no more than 60V.

An electrochemical energy storage system according to an example embodiment of the present invention comprises
- a plurality of electrochemical energy stores;
- a plurality of sensors, in particular for acquiring an electrical voltage of the electrochemical energy store and/or the electrochemical energy storage system;
- at least one first switch per electrochemical energy storage string for electrically connecting the energy storage strings in parallel;
- at least one second switch per electrochemical energy store for electrically bypassing the electrochemical energy store;
- a DC voltage converter for converting voltage levels;
- an inverter;
- at least one third switch for electrically connecting the DC voltage converter to the inverter and the parallel-connected energy storage strings or the DC voltage converter to at least one disconnected energy storage string;
- at least one means, in particular an electronic battery management control unit,
- which is configured to carry out the steps of the method according to the present invention.

Advantageously only a small amount of additional effort necessitated by the second switch for bypassing the electrochemical energy store is required compared to conventional solutions. This enables an almost cost-neutral design that is nonetheless ideally suited for vehicles for which the energy content or the capacity of the electrochemical energy storage system, and thus the useful life, is the primary concern.

The advantages of the method according to the present invention increase further the higher the electrical voltage on the low-voltage side, i.e. in particular in the case of electrical consumers with 24V or 48V.

According to one advantageous embodiment of the present invention, a computer program is provided, which comprises commands that cause the electrochemical energy storage system to carry out the method steps according to the present invention.

According to the present invention, a machine-readable storage medium, on which the computer program is stored, is provided as well.

An electrochemical energy storage system according to the present invention is advantageously used for electric vehicles, fuel cell vehicles, hybrid vehicles, plug-in hybrid vehicles, aircraft, pedelecs or E-bikes, for portable devices for telecommunications or data processing, for electric hand-held tools, and in stationary storage devices for storing in particular regeneratively produced electrical energy.

BRIEF DESCRIPTION OF THE DRAWINGS

Embodiment examples of the present invention are shown in the figures and explained in more detail in the following description.

DETAILED DESCRIPTION OF EXAMPLE EMBODIMENTS

Identical reference signs designate identical device components in all of the figures.

Figure 1:
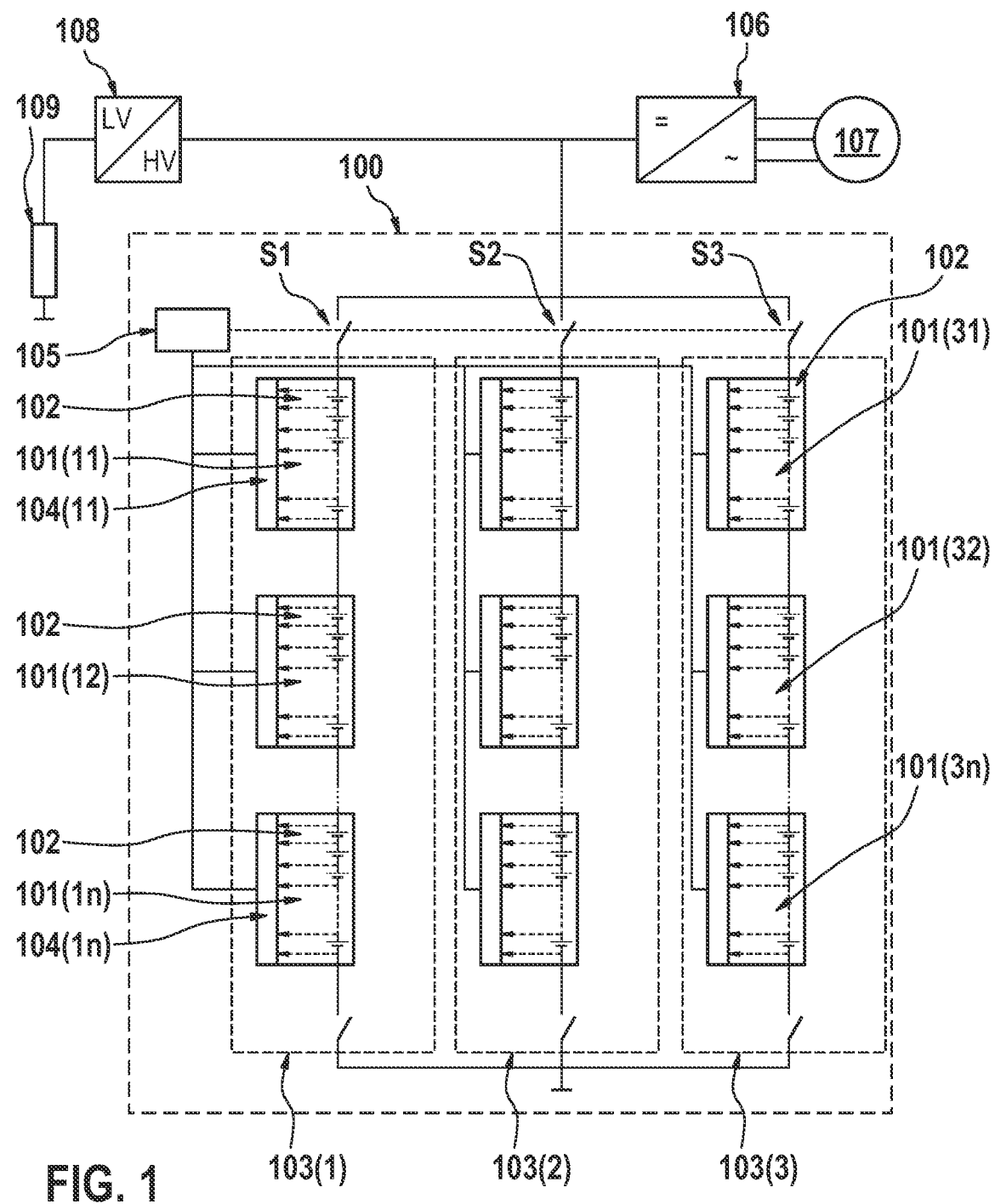
FIG. 1 shows a schematic illustration of an electrochemical energy storage system according to the related art.

FIG. 1 shows a schematic illustration of an electrochemical energy storage system 100 according to the related art. The energy storage system 100 includes a plurality of electrochemical energy stores 101(11), 101(12), 101(1n), 101(31), 101(32), 101(3n) comprising a plurality of electrochemical energy storage cells 102. The electrochemical energy stores 101(11), 101(12), 101(1n), 101(31), 101(32), 101(3n) are divided into energy storage strings 103(1), 103(2), 103(3) and electrically connected in series. The energy storage strings 103(1), 103(2), 103(3) can furthermore be electrically connected in parallel by means of switches S1, S2, S3.

Operating variables, for example the electrical voltage, electrical current and/or temperature, of the electrochemical energy stores 101(11), 101(12), 101(1n), 101(31), 101(32), 101(3n) can be acquired by means of electronic monitoring units 104(11), 104(1n). For this purpose, the electronic monitoring units 104(11), 104(1n) include voltage, current and/or temperature sensors, for example.

A battery management control unit 105 controls the switches S1, S2, S3, so that the electrochemical energy stores 101(11), 101(12), 101(1n), 101(31), 101(32), 101(3n) drive an electric drive 107 by means of an inverter 106 and/or to directly supply electrical consumers 109, for example a 12V battery or hazard warning lights, with power by means of a DC voltage converter 108.

If an energy storage string 103(1), 103(2), 103(3) fails due to a fault, it is disconnected from the remaining energy storage strings 103(1), 103(2), 103(3) of the electrochemical energy storage system 100 by opening one of the switches S1, S2, S3. The electric voltage remains the same, but the capacity decreases accordingly. Both low-voltage consumers 109 and high-voltage consumers, such as the electric drive 107, are supplied from the remaining energy storage strings 103(1), 103(2), 103(3).

Figure 2:
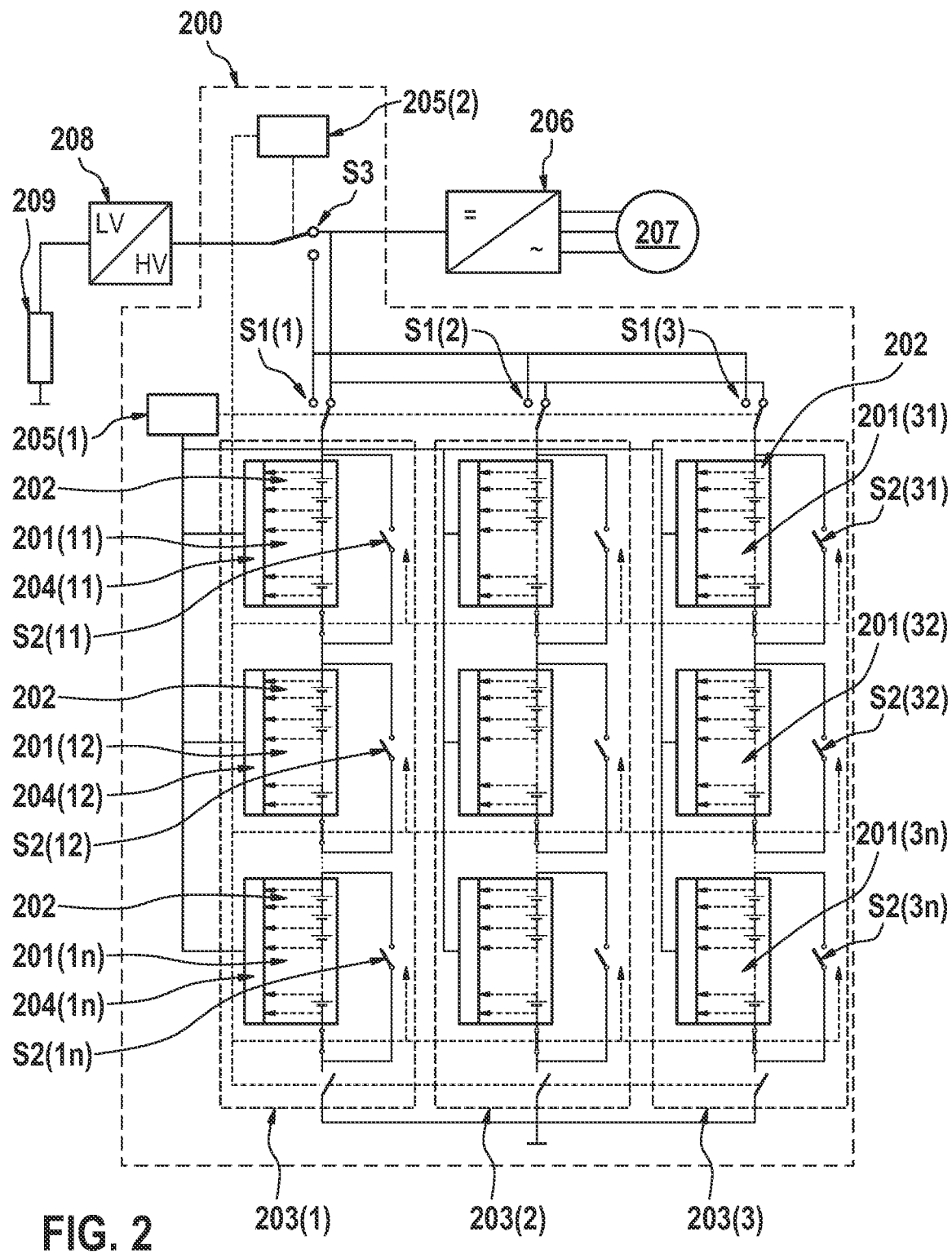
FIG. 2 shows a schematic illustration of an embodiment of an electrochemical energy storage system according to an example embodiment of the present invention FIG. 3 a schematic illustration of a flowchart of an embodiment of a method according to the present invention for operating an electrochemical energy storage system.

FIG. 2 shows a schematic illustration of an embodiment of an electrochemical energy storage system 200 according to the present invention. In the shown embodiment, the electrochemical energy storage system 200 comprises a plurality of energy storage strings 203(1), 203(2), 203(3). The energy storage strings 203(1), 203(2), 203(3) include a plurality of electrochemical energy stores 201(11), 201(12), 201(1n), 201(31), 201(32), 201(3n), which can be electrically connected in series and each comprise a plurality of electrochemical energy storage cells 202 connected in series and/or in parallel.

Operating variables, for example the electrical voltage, electrical current and/or temperature, of the electrochemical energy stores 201(11), 201(12), 201(1n), 201(31), 201(32), 201(3n) can be acquired by means of electronic monitoring units 204(11), 204(12), 204(1n). For this purpose, the electronic monitoring units 204(11), 204(12), 204(1n) include voltage, current and/or temperature sensors, for example.

Energy storage strings 203(1), 203(2), 203(3) can be electrically disconnected by means of first switches S1(1), S1(2), S1(3).

Electromechanical energy stores 201(11), 201(12), 201(1n), 201(31), 201(32), 201(3n) can be electrically bypassed, for example in the event of a fault, by means of second switches S2(11), S2(12), S2(1n), S2(31), S2(32), S2(3n). The remaining intact electrochemical energy stores of an energy storage string 203(1), 203(2), 203(3) provide an electrical voltage that is lower by the voltage of the bypassed electrochemical energy store, for example 60V. This remaining electrical voltage is sufficiently high, however, and is advantageously used to supply power to electrical consumers 209, for example a 12V battery and/or low-voltage consumers.

By means of a third switch S3 disposed between the first switches S1(1), S1(2), S1(3) of the electrochemical energy stores 201(11), 201(12), 201(1n), 201(31), 201(32), 201(3n) and a DC voltage converter 208, the disconnected energy storage string can be electrically connected to an input of the DC voltage converter 208 to supply the electric consumers 209.

The electrical voltage of the disconnected energy storage string is therefore applied only to an input of the DC voltage converter 208, as a result of which the electrical consumers 209 are supplied exclusively via the disconnected energy storage string.

All other electrochemical energy stores that are not disconnected, i.e. are intact, remain connected to an electric drive 207 by means of an inverter 206.

As a result, more energy is advantageously available for this high voltage side of the electrochemical energy storage system 200, which can be used for the electric drive 207, i.e. no breakdown in the event of a fault, for example, and for work machines for a working process, i.e. no immediate termination of the working process in the event of a fault for example.

A battery management control unit 205(1) controls the first switches S1(1), S1(2), S1(3) and the second switches S2(11), S2(12), S2(1n), S2(31), S2(32), S2(3n) via a wired and/or wireless connection. A further control unit 205(2), for example a second battery management control unit or a vehicle control unit (VCU), which is connected to the battery management control unit 205(1), the inverter 206, the DC voltage converter 208 and the third switch S3 in a wired and/or wireless manner, is provided as well.

Figure 3:
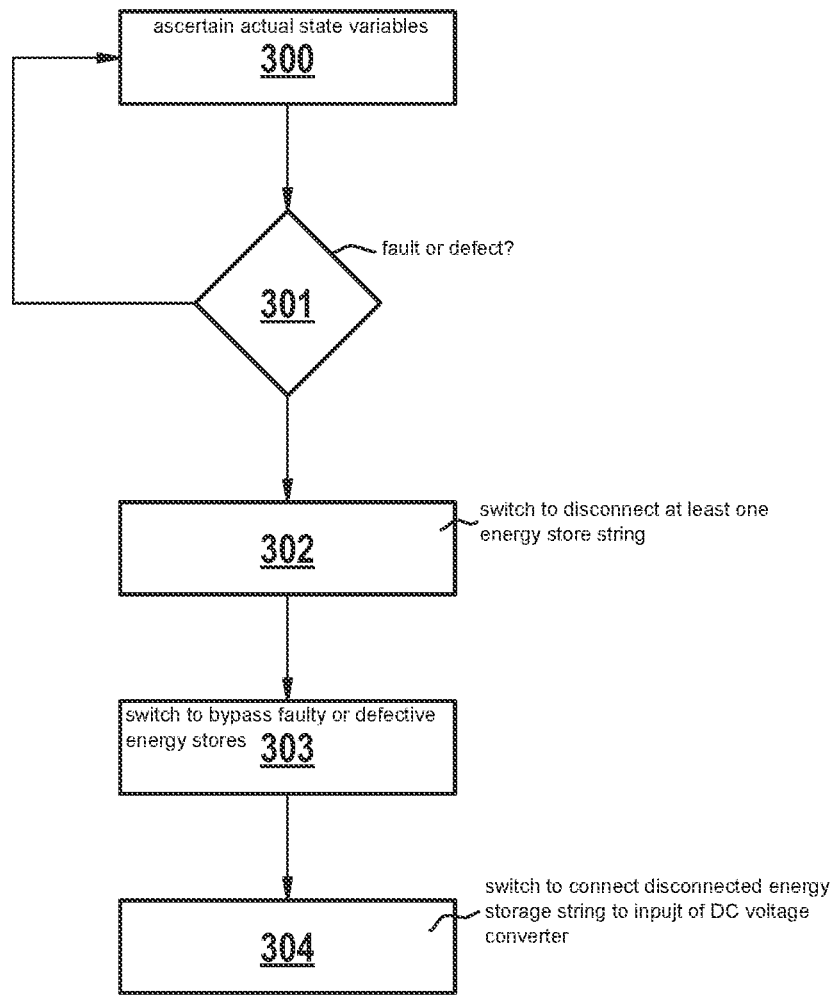

FIG. 3 shows a schematic illustration of a flowchart of an embodiment of a method according to the present invention for operating an electrochemical energy storage system.

In method step 300, actual state variables of the electrochemical energy store 201(11), 201(12), 201(1n), 201(31), 201(32), 201(3n) which represent a current state of the electrochemical energy store 201(11), 201(12), 201(1n), 201(31), 201(32), 201(3n) are ascertained.

In method step 301, the ascertained actual state variables are compared with target state variables which represent a target state of the electrochemical energy stores 201(11), 201(12), 201(1n), 201(31), 201(32), 201(3n).

If the comparison shows a fault or a defect in one or more of the electrochemical energy store 201(11), 201(12), 201(1n), 201(31), 201(32), 201(3n), for example, then at least one of the first switches S1(1), S1(2), S1(3) is switched to electrically disconnect at least one energy storage string 203(1), 203(2), 203(3) in method step 302.

In method step 303, at least one second switch S2(11), S2(12), S2(1n), S2(31), S2(32), S2(3n) is switched to electrically bypass faulty or defective electrochemical energy stores in the disconnected energy storage string. For this purpose, the respective second switches S2(11), S2(12), S2(1n), S2(31), S2(32), S2(3n) are actuated by the battery management control unit 205 and the respective electrochemical energy store 201(11), 201(12), 201(1n), 201(31), 201(32), 201(3n) is bypassed.

In method step 304, a third switch S3 disposed between the electrochemical energy stores 201(11), 201(12), 201(1n), 201(31), 201(32), 201(3n) and a DC voltage converter 208, is switched which electrically connects the disconnected energy storage string to an input of the DC voltage converter 208. As a result, the electrical consumers 209 are supplied with energy from the disconnected, faulty energy storage string. The electric drive 207 continues to be supplied by the intact energy storage strings that have not been disconnected via the inverter 206.

What is claimed is:

1. A method for operating an electrochemical energy storage system with a plurality of energy storage strings which each include a plurality of electrochemical energy stores, wherein the energy storage strings are configured to be electrically connected in parallel using first switches, the method comprising the following steps:
   a) ascertaining actual state variables of the electrochemical energy stores which represent a current state of the electrochemical energy stores;
   b) comparing the actual state variables with target state variables which represent a target state of the electrochemical energy stores;
   c) switching at least one of the first switches to electrically disconnect at least one of the energy storage strings as a function of the comparison;
   d) switching at least one second switch to electrically bypass the electrochemical energy stores in the disconnected energy storage string; and
   e) switching a third switch disposed between the electrochemical energy stores and a DC voltage converter to electrically connect the disconnected energy storage string to an input of the DC voltage converter.

2. The method for operating an electrochemical energy storage system according to claim 1, further comprising the following step:
   f) driving the DC voltage converter with a predetermined target voltage variable.

3. The method for operating an electrochemical energy storage system according to claim 1, further comprising the following step:
   g) providing a voltage variable at an output of the DC voltage converter which represents an electric voltage adapted to electrical consumers.

4. An electrochemical energy storage system, comprising:
   a plurality of electrochemical energy storage strings which each include a plurality of electrochemical energy stores;
   a plurality of sensors configured to acquire an electrical voltage of the electrochemical energy stores and/or the electrochemical energy storage system;
   at least one first switch per electrochemical energy storage string configured to electrically connect the energy storage strings in parallel;
   at least one second switch per electrochemical energy store configured to electrically bypass the electrochemical energy store;
   a DC voltage converter configured to convert voltage levels;
   an inverter;
   at least one third switch configured to electrically connect the DC voltage converter to the inverter and the parallel-connected energy storage strings or the DC voltage converter to at least one disconnected energy storage string; and
   an electronic battery management control unit configured to operate the electrochemical energy storage system, the electronic battery management control unit configured to:

a) ascertain actual state variables of the electrochemical energy stores which represent a current state of the electrochemical energy stores,
b) compare the actual state variables with target state variables which represent a target state of the electrochemical energy stores,
c) switch at least one of the first switches to electrically disconnect at least one of the energy storage strings as a function of the comparison,
d) switch at least one of the second switches to electrically bypass the electrochemical energy stores in the disconnected energy storage string, and
e) switch a third switch of the at least one third switch disposed between the electrochemical energy stores and the DC voltage converter to electrically connect the disconnected energy storage string to an input of the DC voltage converter.

5. A non-transitory machine-readable storage medium on which is stored a computer program for operating an electrochemical energy storage system with a plurality of energy storage strings which each include a plurality of electrochemical energy stores, wherein the energy storage strings are configured to be electrically connected in parallel using first switches, the computer program, when executed by a computer, causing the computer to perform the following steps:

a) ascertaining actual state variables of the electrochemical energy stores which represent a current state of the electrochemical energy stores;
b) comparing the actual state variables with target state variables which represent a target state of the electrochemical energy stores;
c) switching at least one of the first switches to electrically disconnect at least one of the energy storage strings as a function of the comparison;
d) switching at least one second switch to electrically bypass the electrochemical energy stores in the disconnected energy storage string; and
e) switching a third switch disposed between the electrochemical energy stores and a DC voltage converter to electrically connect the disconnected energy storage string to an input of the DC voltage converter.

6. The electrochemical energy storage system according to claim 4, wherein the electrochemical energy store system is configured for an electric vehicle, or a fuel cell vehicle, or a hybrid vehicle, or a plug-in hybrid vehicle, or an aircraft, or a pedelec, or an E-bike, or a portable device for telecommunications or data processing, or an electric hand-held tool, or a stationary storage device for storing regeneratively produced electrical energy.

* * * * *